May 2, 1961 H. G. FEISSEL 2,982,920

SYNCHRONISING DEVICES FOR USE IN ELECTRONIC CALCULATORS

Filed Feb. 19, 1957 4 Sheets-Sheet 1

SYNCHRONISING DEVICES FOR USE IN ELECTRONIC CALCULATORS

Filed Feb. 19, 1957

4 Sheets-Sheet 3

May 2, 1961 H. G. FEISSEL 2,982,920

SYNCHRONISING DEVICES FOR USE IN ELECTRONIC CALCULATORS

Filed Feb. 19, 1957 4 Sheets-Sheet 4

United States Patent Office 2,982,920

Patented May 2, 1961

2,982,920

SYNCHRONISING DEVICES FOR USE IN ELECTRONIC CALCULATORS

Henri Gérard Feissel, Paris, France, assignor to Compagnie des Machines Bull (Societe Anonyme), Paris, France Filed Feb. 19, 1957, Ser. No. 641,218

Claims priority, application France Feb. 24, 1956

1 Claim. (Cl. 331—17)

Figure 1:
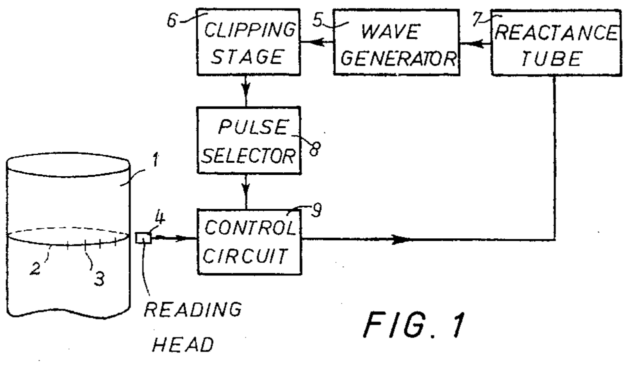

The present invention relates to a synchronising device for use in an electronic calculator comprising a magnetic drum, and concerns more especially a synchronising device for use in an electronic calculator which is intended to perform arithmetical operations on numbers translated into coded pulse trains, the said calculator simultaneously comprising circuits for the high-speed circulation of pulses and a rotatable magnetic drum constituting a device for the accumulation of data or intermediate results. The circulating pulses are obtained from a periodic pilot-pulse train, the repetition rate of which constitutes a feature of the machine. The recording and reading of the data or intermediate results, in the form of magnetic marks, on the drum must be effected at very precise instants depending upon the pilot pulse train. Synchronism must exist between the reading or the recording of the drum and the general operation of the machine, timed by the pilot pulse generator. It has already been proposed for this purpose to record the pilot pulses on a control track on the drum (or pulses derived from the latter by frequency division) in the form of magnetic marks, the reading of which serves to authorise the transfers of data or intermediate results accumulated on the drum. Such a method is more particularly applicable to parallel calculators, while the method according to the invention is applicable mainly to series or series-parallel calculators in which the transfers from the drum to the pulse circulation memories take place along a single conductor or a small number of conductors. In the latter type of calculators, the frequency of the pulses of the pilot train is generally a number of times higher than the reading frequency of the marks on the drum. Therefore, the problem arises of producing phase synchronism between the reading of the marks on the drum, which may be equidistant control marks recorded once and for all on the said drum, and the pilot pulses, mainly by reason of the instantaneous speed variations of the drum. It has been proposed to synchronise the driving motor of the drum by means of the pilot pulse generator by acting on the feed of the said motor. This device is likely to allow considerable phase differences to subsist as a result of the very low response frequency of the correcting device. It is also possible to obtain pilot pulses by frequency multiplication from the pulses for reading the marks. This method, as is known, only incompletely corrects the phase differences.

An object of the present invention is to avoid the aforesaid disadvantages, and is based on the observation that the repetition rate of the pilot pulses may vary without disadvantage within certain limits, provided that the whole machine is rendered dependent upon these pulses. The said pulse train constantly defines a relative time for the whole of the machine. The momentary repetition rate of the pilot pulses must then be constantly proportional to the momentary angular velocity of the drum.

Accordingly, the invention provides an electrical device for synchronising timing pulses, having a repetition rate, with the rotation of a magnetic drum comprising control equidistant magnetic marks recorded on said drum, means for reading said marks for generating control pulses, means for generating selected pulses from said timing pulses, means for generating an error correcting voltage from said control pulses and said selected pulses, modulation means for modulating the repetition rate of said timing pulses controlled by said error correcting voltage whereby said timing pulses are synchronised with the rotation of said magnetic drum.

In accordance with one main feature of the invention, the pilot pulses are frequency-modulated by a control device controlled by a control voltage, the amplitude of which is a function of the time differences between the passages of selected pilot pulses through a control circuit and the travel of corresponding reference magnetic marks recorded on the drum past a reading head, this control voltage being positive or negative in accordance with whether the selected pilot pulses are in advance or lagging with respect to the corresponding pulses for the reading of the marks in question.

In accordance with a second feature of the invention, the control device is blocked at the starting of the machine as long as the reading instants of a special single control mark, distinct from the preceding control marks, which is recorded on the drum do not coincide with the instants where there pass through a control circuit corresponding pulses of a periodic pulse train selected from the pilot pulses, and of which the pulse period is substantially the period of rotation of the drum at its normal operating speed.

In accordance with a third feature of the invention, the synchronising device comprises two control devices each supplying a control voltage emanating from the continuous comparison of pulses selected from pilot pulses with the pulses for the reading of the reference marks recorded on the drum, the said devices being connected in parallel and electronically changed over so that one supplies a slow control from a single control mark and the other a rapid control from a larger number of control marks.

Figure 4:
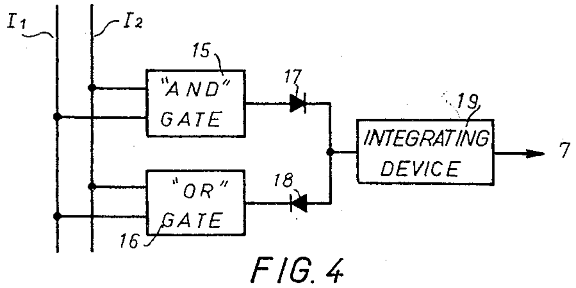
Figure 3:
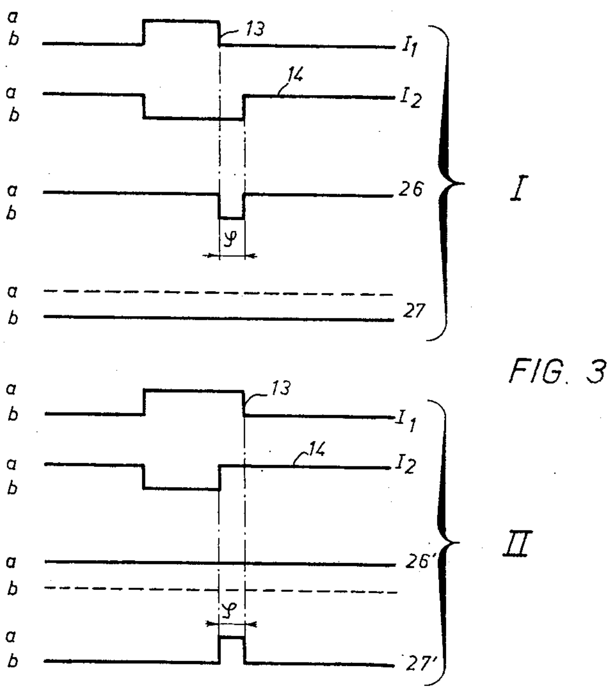
Figure 5:
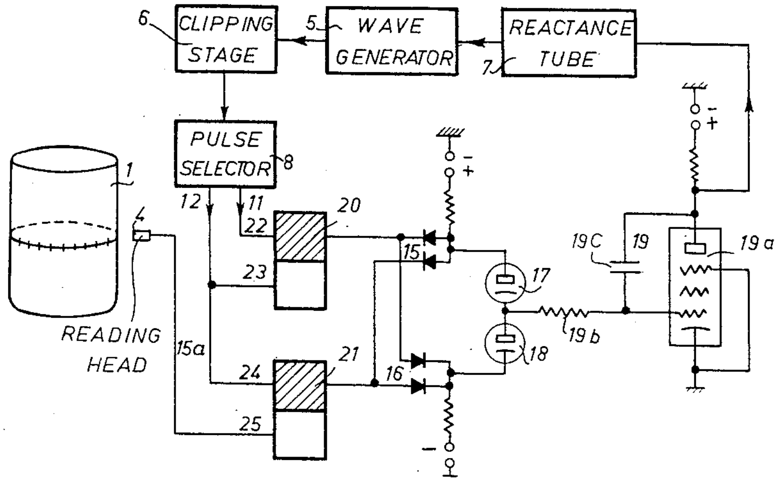
Figure 6:
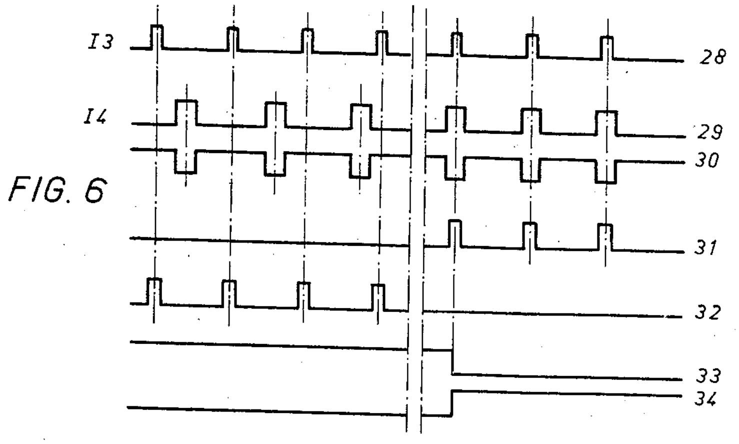
Figure 7:
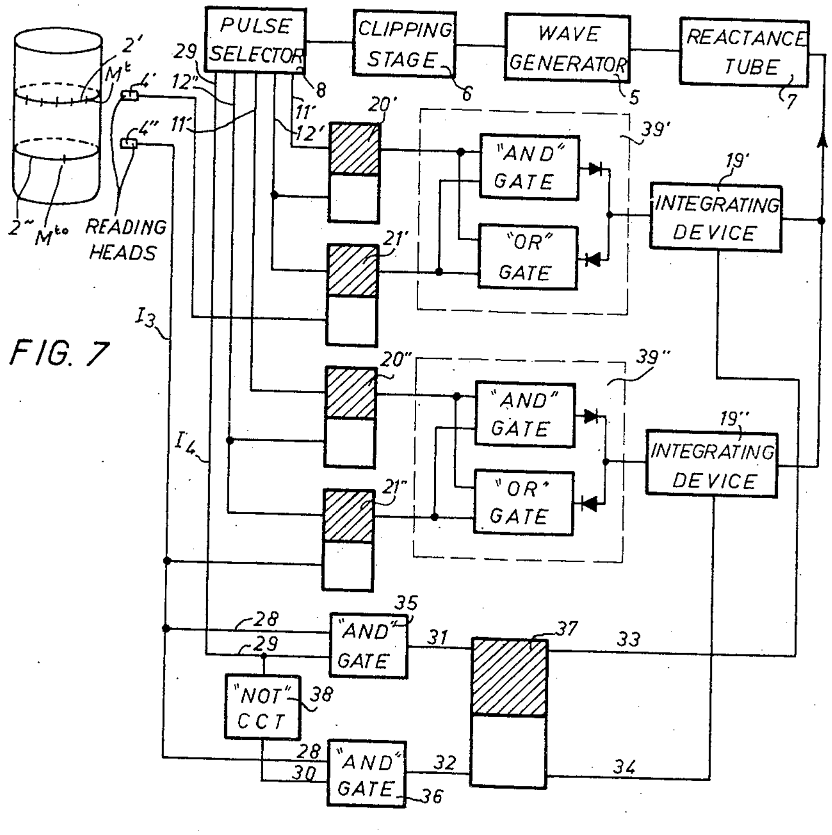
Figure 8:
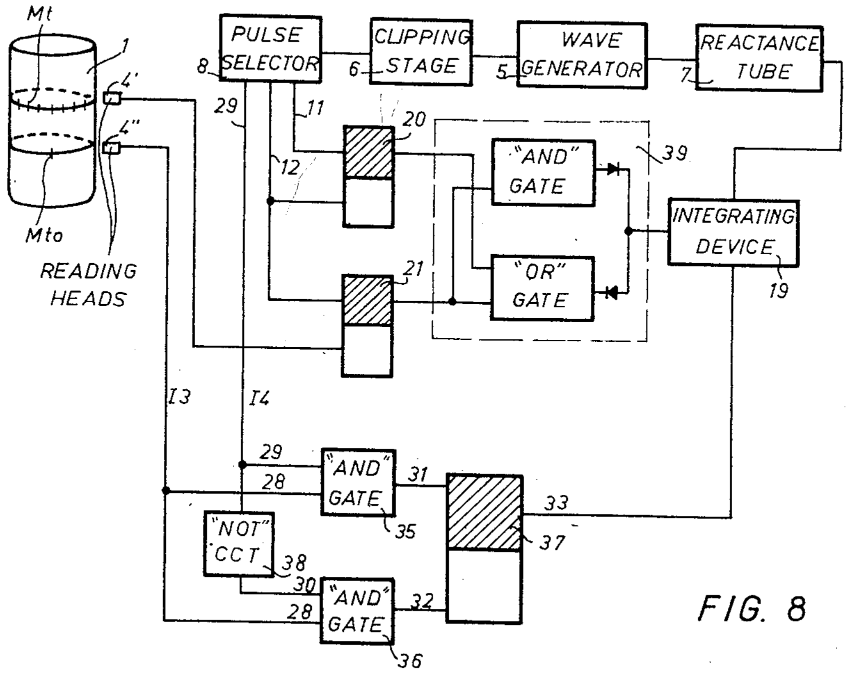

For a better understanding of the invention and to show how it may be carried into effect, the same will now be described, by way of example, with reference to the accompanying drawings, in which:

Figure 1 is a circuit diagram illustrating the principle of a device according to the invention, Figures 2 and 3 and 6 and 9 represent pulse trains employed in the said device, Figure 4 shows an element of a circuit for the generation of the control voltage, Figure 5 shows a complete circuit arrangement for the generation of the control voltage, Figures 7 and 8 illustrate circuit arrangements for the generation of the blocking voltage or of the switching voltages.

In all these figures, like elements bear like reference numerals.

In the following description, a pulse train is designated by I, and the notation $\bar{I}$ (I stroke) accordingly designates a pulse train such that $$\frac{I+\bar{I}}{2}$$

represents a constant potential. These two trains therefore have inverse polarity with respect to an appropriately chosen zero potential.

In Figure 1, the magnetic drum is designated by 1, the control track by 2 and the equidistant marks by 3. These marks are recorded once and for all on the said drum. The reading head is illustrated at 4. The pilot pulse train is generated from the sinusoidal continuous wave generator 5 by clipping in the stage 6. The generator 5 is an autodyne oscillator of known type, the frequency of which is defined by an oscillating circuit. This oscillating circuit is shunted by a reactance tube 7 adapted to produce a frequency swing of the generator 5 under the action of a control voltage applied to the control grid of the said reactance tube. A pulse selector 8 generates a periodic pulse train derived from the pilot train, the repetition period of which is substantially equal to the interval of time elapsing between the reading of two successive marks on the control track 2. The pulses delivered by the selector 8 and the pulses emanating from the reading of the control marks by the magnetic head 4 are sent to the input of a circuit 9 which generates at its output a control voltage, the amplitude of which is a function of the interval of time elapsing between the arrival of the two corresponding pulses emanating from 4 and from 8 and the sign of which is positive or negative depending upon whether one of these pulses leads or lags behind the other. This control voltage is applied to a control electrode of the reactance tube 7. The chain 7, 5, 6, 8, 9 thus constitutes a servomechanism which tends constantly to cancel out the control voltage and consequently to synchronise the pilot generator of the machine with the rotation of the drum.

Figure 2:
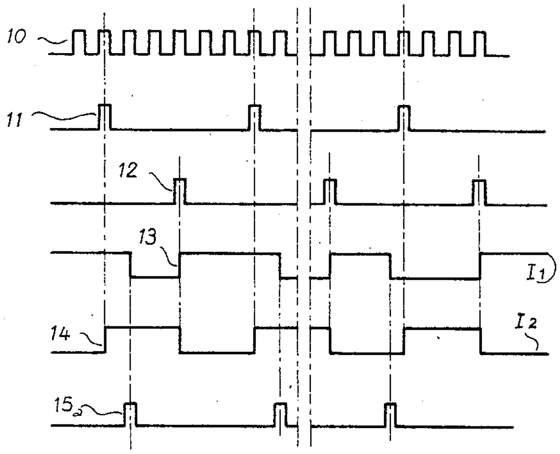

In Figure 2, the pilot pulse train is shown at 10, and the periodic train selected by the selector 8 at 11. The pulses for the reading of the control marks are represented by 15*a*. The pulses of the train 11 are synchronous with the corresponding selected pulses of the train 10, as will be apparent from this figure. Such a method of selection is known per se. It is in fact reduced to a pulse counting. An example of a circuit such as 9 will now be described. There are first generated in the control circuit 9 two intermediate pulsatory trains 13 and 14, the voltages of which are designated by $I_1$, $I_2$ in Figure 2, from the trains 10 and 11 and from an auxiliary train 12 having the same repetition rate as the train 11, but out of phase with respect thereto. This auxiliary train can also be generated by the selector 8. A component pulse of the first train 13 is released by a pulse emanating from 12 and suppressed by the first reading pulse emanating from the head 4. A component pulse of the second train 14 is released by a pulse emanating from the selector 8, i.e. supplied by 11, and suppressed by the following pulse emanating from 12. The voltages $I_1$ and $I_2$ are then applied to the input of the circuit arrangement of Figure 4, which comprises an "AND" gate 15 and an "OR" gate 16, two rectifiers 17 and 18, the forward direction of which is indicated by the arrows, and an intergrating device 19 of known type. The operation of such a circuit arrangement will be understood by reference to the diagrams of Figure 3. The first group I concerns the case where the pulse for reading the reference mark leads the selected pulse of the pilot train, and the group II concerns the opposite case. There is shown at 26 and 26′ the output voltage of the "OR" gate 16, and at 27 and 27′ that of "AND" gate 15 (which "AND" gate and "OR" gate are shown in Figure 4) in the two hypothetical cases in question, as a function of time. The lower and upper levels of the said voltages are represented by *b* and *a*. The voltages 26 and 26′ are at the level *a* as long as at least one of the voltages $I_1$ or $I_2$ is at the level *a*. They are at the level *b* when the two voltages $I_1$ and $I_2$ are at the level *b*. Similarly, the voltages 27 and 27′ are at the level *b* when at least one of the voltages $I_1$ or $I_2$ is at the level *b*. They are at the level *a* when the two voltages $I_1$ and $I_2$ are at the level *a*. This recapitulation of definitions will enable the corresponding diagrams to be readily traced. The voltage at the input of the integrator 19 is the voltage 26 in the case I and the voltage 27′ in the case II. In the first case, therefore, there is obtained at the input of the integrating device 19 a negative pulse (signal 26), the duration $\varphi$ of which is proportional to the time spacing between the pulses emanating from 4 and from 8, and in tne second case there is obtained a similar positive pulse (signal 27′), and there is obtained at the output a positive or negative control voltage, the amplitude of which is a function of the time difference which it is desired to cancel out. This control voltage is sent to the input of the reactance tube 7 so as to vary the momentary frequency of the generator 5 in the desired sense.

Figure 5 shows a more detailed diagram of the whole control circuit 9. The selector 8 generates the pulse trains represented at 11 and 12 in Figure 2. The reading head 4 for the control marks of the drum generates also a pulse train which is designated by 15*a* in Figure 2. The trains 11 and 12 emanating from the selector 8 are applied to the two inputs 22 and 23 of an electronic bistable multivibrator 20 having two inputs of a type well known in the art. Similarly, the trains 12 and 15*a* emanating from the selector 8 and from the reading head 4 respectively are applied to the two inputs 24 and 25 of the bistable multivibrator 21. The bistable multivibrators 20 and 21 supply respectively at their outputs the voltages $I_2$ and $I_1$ shown in Figure 3. These voltages are applied to a circuit arrangement 15, 16, 17, 18 already illustrated in Figure 4, the operation of which has previously been described. The output voltage from this circuit arrangement, which is represented by 26 or 27′ in Figure 3 as hereinbefore indicated, is applied to the integrating device 19, which comprises the tube 19*a*, the resistance 19*b* and the condenser 19*c*. Such a device, which is well known in the art, supplies from its output to the anode of the tube 19 an integral of the voltage which is supplied thereto, and therefore a voltage which is a function of the time difference between the pulses which are compared, this time difference being equal to the width $\varphi$ of the pulses of the signals 26, 27′ of Figure 3. This control voltage is applied to the input of the reactance tube 7, which modulates the frequency of the generator 5 and consequently the repetition rate of the pilot pulses generated by the stage 6 in a direction such that these pilot pulses constantly tend to cancel out the said control voltage and therefore to synchronize themselves with the movement of the drum. The reactance tube 7, the generator 5 and the clipping stage 6 are well known in the radio-communications art and have not been described in detail.

Such a device is readily applicable to the case where only a single control mark is recorded. In another method of operation of the said device, a fairly large number of equidistant control marks are recorded to form a closed track on the drum.

A difficulty then arises when the machine is started. It is necessary, more especially for effecting arithmetical operations, to locate the pilot pulses with respect to a clearly determined time origin which must coincide with the time when a predetermined mark travels past a reading head. This arises from the fact that the transfers to the drum or from the drum towards the rapid memories of the machine take place by location of marks recorded on the drum from an origin mark. Now, the pilot generator and the drum start independently of one another and if no special precaution is taken a reading pulse for any mark on the drum will become synchronised with any pulse of the pilot generator at the instant when the drum reaches its normal operating speed. In accordance with the invention, therefore, the drum comprises a series of equidistant marks $M_t$ on a first control track, which are read by a first magnetic head, and an isolated origin mark $M_{t_0}$ on a second control track, which latter mark is read by a second magnetic head. The servo-mechanism generates two control voltages with the aid of two devices which are each similar to those of Figure 5, the second device controlling the pilot train from the single mark on the second track. The first device compares the pulses for the reading of the marks in question with a first train of periodic pulses, selected from the pilot generator by counting. The second device compares the reading pulses for the single mark on the second track with a second "zeros" pulse train, also selected from the pilot generator, of which the period, equal to the theoretical period of rotation of the drum, is an exact multiple of the period of the pulses of the first train defined in the foregoing. These "zeros" pulses define the time of origin of the calculator. These two devices are electronically changed over so that the first is blocked as long as the period for the reading of the single mark of the second track does not coincide with the "zero" pulse of appropriate width mentioned above, which defines the origin time of the calculator. When this coincidence is effected, the second device is switched off, and the first is set in operation. The first device then controls the pilot train. At the starting of the calculator, when the normal speed of operation of the drum is reached, the second device rapidly cancels out the phase error by producing a coincidence and the aforesaid change-over system blocks the second device and sets the first in operation, in principle until the drum stops. Figure 6 shows the different pulse trains which enter into this embodiment. The pulse train $I_3$ for reading the single mark $M_{t_0}$ of the drum is shown at 28, and the pulse train $I_4$ representing the "zero" pulse selected from the pilot pulses is shown at 29. There are also shown at 30 the pulse train $\bar{I}_4$, at 31 the train $I_3$ "and" $I_4$, which is usually written $I_3.I_4$, that is to say, the output pulse train of an "AND" gate excited by the trains $I_3$ and $I_4$, and at 32 the train $I_3.\bar{I}_4$, which is the output train of an "AND" gate excited by $I_3$ and $\bar{I}_4$. If the trains 31 and 32 are applied respectively to the two inputs of a bistable multivibrator having two outputs supplying signals in phase opposition, the said output signals will be represented by 33 and 34. If the signal 33 is applied to the first device described in the foregoing, and the signal 34 to the second, so as to block the said devices for the positive values of the said voltages, it will readily be seen that the first device will be blocked and the second released as long as $I_3$ and $I_4$ are not coincident and conversely the first will be released and the second blocked in the opposite case. Figure 7 shows the circuit arrangement employed. The drum 1 comprises two tracks 2′ and 2″ read by the magnetic heads 4′ and 4″. The track 2′ bears a series of equidistant marks $M_t$, and the track 2″ a single mark $M_{t_0}$. The selector 8 generates 5 pulse trains: the trains 11′ and 12′ (represented by 11 and 12 in Figure 2) out of phase with respect to one another, have a common period equal to the theoretical interval of time separating the readings of two successive marks $M_t$ of the track 2′; the trains 11″ and 12″, also out of phase with respect to one another, have a common period equal to the theoretical period of rotation of the drum. The train 11″ is the "zeros" pulse train which defines the origin of the times of the calculator. The train $I_4$ (shown at 29 in Figure 6) is a pulse train synchronous with the train 11″, but the width of the pulses of which is appropriately calculated. The two control devices are represented respectively by the elements 20′, 21′, 39′, 19′ and 20″, 21″, 39″, 19″, the elements 39′ and 39″ being each equivalent to all of the circuits **15*b*, 16, 17, 18 of Figure 5. The first control device is fed by the trains 11′, 12′ and the reading train for the marks $M_t$ by the head 4′, the second is fed by the trains 11″, 12″ and the train 28 (or $I_3$) for the reading of the mark $M_{t_0}$ by the head 4″. The element 38 is a logical "not" circuit, which supplies to the output 30 a train of inverse polarity to the input train 29. The pulse trains 28 and 29 (shown in Figure 6) act on an "AND" gate 35 and the trains 28 and 30 (also shown in Figure 6) act on an "AND" gate 36. Their output voltages 31 and 32 (shown in Figure 6) act on a bistable multivibrator 37 which in turn supplies at its output voltages 33 and 34 (shown in Figure 6) for blocking the two control devices. These voltages are applied to the two integrating devices 19′ and 19″** of the control devices in question, which they block when they are at the highest level.

It is also possible to generate only one control voltage by means of a single control device while maintaining the previous commutation. The corresponding device is shown in Figure 8. The same elements are shown therein as in Figure 7, but with a single control chain 20, 21, 39, 19. The output voltage 33 of the bistable multivibrator 37 is applied to the integrating device 19, which it blocks when it is at the highest level. The control device is therefore blocked by the voltage 33 (Figure 6) in the absence of coincidence between the pulses $I_3$ and $I_4$. It is released by the same voltage 33 when a coincidence is observed between the pulses $I_3$ and $I_4$. At the starting of the calculator and before the drum reaches its normal operating speed, a large number of coincidences occur and release the control device which, however, does not operate by reason of the frequency response of the reactance tube. When the drum reaches its normal operating speed, a further coincidence, which will certainly occur by reason of the slight variations in the speed of the drum about its mean speed, releases the control device, which then effectively controls the frequency of the pulse generator. It is necessary for the "zero" pulse $I_4$ to have sufficient width, although this width must be smaller than the theoretical period of the pulses for the reading of the marks $M_t$. The synchronisation of the pilot pulses of the calculator with the drum here takes generally a longer time than in the previous device, in which the second chain of the servomechanism would accelerate the production of the coincidence between the pulses $I_3$ and $I_4$. In practice, perfectly satisfactory results have been obtained with one hundred and twenty-eight control marks for a drum, the maximum capacity of a track of which is 6144 marks, which represents a selection of 1 mark out of 48, the frequency for the reading of the operating marks being 280 kcs. and the drum rotating at about 2750 r.p.m.

Many modifications are possible and fall within the scope of the invention. More especially, the variation of the frequency of the pilot train may be obtained by any known means, such as a multivibrator, a condenser having a high dielectric coefficient, etc. The error voltage may be generated from two pulse trains staggered in time by any known means, such as those used in the technique of pulse-modulation for telecommunications.

Figure 9:
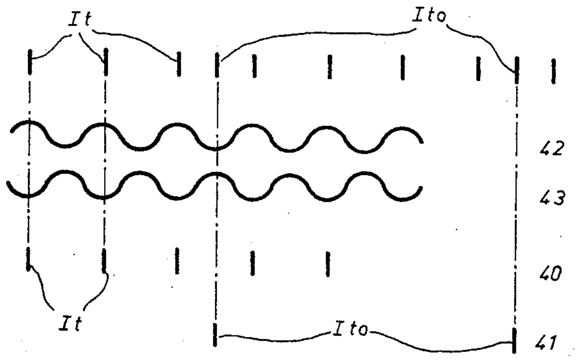

For the rest, the isolated origin mark may be engraved on the same track and read by the same head as the equidistant control marks. In this case, this mark must be capable of selection during its travel past the feeding head and must be able to give rise to a pulsatory voltage which is sent into a special circuit. For this purpose, the said mark $M_{t_0}$ is, for example, recorded substantially at the mid-point of the interval separating two equidistant control pulses $M_t$. Figure 9 shows how it is possible to separate the reading pulses $I_t$ for the marks $M_t$ from the reading pulse $I_{t_0}$ for the mark $M_{t_0}$. The total pulse train formed by the reading pulses for the said marks is sent to the input of a band-pass filter having an appropriate central frequency, which supplies the sinusoidal voltage 42. The voltage 43 is derived from this voltage by phase reversal. The voltage 42 gated by the train $I_t$—$I_{t_0}$ supplies the train 40, while the voltage 43 gated by the same train $I_t$—$I_{t_0}$ supplies the train 41. The train 41 can then be sent into a separate circuit and can perform the function of the pulse train for the reading of the single mark of the second control track hereinbefore referred to. The separation of the pulses $I_t$ and $I_{t_0}$ may also be effected by any known methods employing monostable multivibrators.

I claim:

An electrical device for controlling the repetition rate of timing pulses comprising a recording drum rotatable by an electric motor having a control track along which control marks are recorded at equal distances, a reading head associated with the control track and from which control pulses corresponding to said control marks are read out as the drum rotates, a sinusoidal wave oscillator, a timing pulses generator for generating timing pulses fed by said oscillator whereby the repetition rate of said timing pulses is equal to the frequency of said oscillator, means for selecting from said timing pulses two trains of selected pulses of equal repetition rate and out of phase with respect to one another, said repetition rate being a submultiple of that of said timing pulses, a comparison circuit to which said control pulses and said trains of selected pulses are applied and which compares the phase of said control pulses and of said trains of selected pulses and produces an error correcting voltage as a result of the comparison, said comparison circuit comprising two bistable multivibrators, said control pulses and one of said trains of selected pulses being applied to one of said multivibrators and said two trains of selected pulses being applied to the other of said multivibrators, an "AND" gate and an "OR" gate, the two inputs of each of these gates being connected to the outputs of said multivibrators and an integrator the input of which is connected through unidirectional elements to the output of each of said gates and at the output of which is obtained said error correcting voltage, a reactance tube connected to said sinusoidal oscillator and controlled by said error correcting voltage so that said sinusoidal oscillator is frequency modulated whereby said timing pulses are synchronised with the rotation of said magnetic drum.

References Cited in the file of this patent

UNITED STATES PATENTS

| | | |
|---|---|---|
| 2,490,500 | Young | Dec. 6, 1949 |
| 2,495,946 | Schuler | Jan. 31, 1950 |
| 2,774,872 | Howson | Dec. 18, 1956 |
| 2,797,378 | Johnson | June 25, 1957 |
| 2,817,701 | Johnson | Dec. 24, 1957 |
| 2,828,478 | Johnson | Mar. 25, 1958 |